(12) United States Patent
Pepper et al.

(10) Patent No.: US 10,686,581 B2
(45) Date of Patent: Jun. 16, 2020

(54) METHODS, SYSTEMS, AND COMPUTER READABLE MEDIA FOR TRANSMIT TIMESTAMP AUTOCALIBRATION

(71) Applicant: Keysight Technologies, Inc., Santa Rosa, CA (US)

(72) Inventors: Gerald Raymond Pepper, Newbury Park, CA (US); Robert Brian Luking, Ellicott City, MD (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 15/900,255

(22) Filed: Feb. 20, 2018

(65) Prior Publication Data
US 2019/0260568 A1   Aug. 22, 2019

(51) Int. Cl.
*H04L 7/00*    (2006.01)
*H04L 12/26*   (2006.01)
*H04L 1/00*    (2006.01)
*H04L 29/08*   (2006.01)
*H04J 3/06*    (2006.01)

(52) U.S. Cl.
CPC .......... *H04L 7/0008* (2013.01); *H04L 1/0041* (2013.01); *H04L 43/08* (2013.01); *H04L 69/323* (2013.01)

(58) Field of Classification Search
CPC ..... H04L 7/0008; H04L 1/0041; H04L 43/08; H04L 69/323
USPC ........................................................ 370/503
See application file for complete search history.

(56) References Cited

U.S. PATENT DOCUMENTS

| | | | |
|---|---|---|---|
| 5,987,042 A * | 11/1999 | Staver | H01S 3/0057 372/30 |
| 6,970,013 B1 | 11/2005 | Cory | |
| 7,064,685 B1 | 6/2006 | Xue et al. | |
| 7,151,945 B2 | 12/2006 | Myles et al. | |
| 7,447,931 B1 | 11/2008 | Rischar et al. | |
| 8,949,448 B1 * | 2/2015 | Saxtorph | H04L 69/28 341/61 |
| 2008/0043276 A1 | 2/2008 | Escott | |
| 2009/0086847 A1 | 4/2009 | Lei et al. | |
| 2012/0082156 A1 * | 4/2012 | Swartzentruber | H04L 41/147 370/389 |
| 2014/0269769 A1 * | 9/2014 | Gresham | H04L 69/28 370/474 |

(Continued)

*Primary Examiner* — Yemane Mesfin
*Assistant Examiner* — Intekhaab A Siddiquee

(57) ABSTRACT

A method for transmit timestamp autocalibration includes generating a calibration pulse for calibrating a transmit timestamp in a transmitting device. The method further includes applying the calibration pulse to a transmit data pipeline in the transmitting device. The method further includes sampling a transmit timestamp when the calibration pulse reaches a timestamp sample triggering location in the transmit data pipeline upstream from an egress point of the transmitting device. The method further includes measuring a latency between a time that the calibration pulse reaches the timestamp sample triggering location and a time that the calibration pulse reaches a location downstream from the timestamp sample triggering location. The method further includes generating an adjusted timestamp based on the measured latency and inserting the adjusted timestamp into a data packet to be transmitted from the transmitting device.

18 Claims, 3 Drawing Sheets

(56) References Cited

U.S. PATENT DOCUMENTS

2014/0269778 A1* 9/2014 Yang ................... H04J 3/0697
370/503

* cited by examiner

METHODS, SYSTEMS, AND COMPUTER READABLE MEDIA FOR TRANSMIT TIMESTAMP AUTOCALIBRATION

TECHNICAL FIELD

The subject matter described herein relates to generating timestamps to be included in transmitted data. More particularly, the subject matter described herein relates to methods, systems, and computer readable media transmit timestamp autocalibration.

BACKGROUND

Timestamps are often included in data that is transmitted over a network. For example, timestamps are inserted in packets or frames transmitted over a network. The timestamps are used by network protocols and by test devices to measure one-way latency, two-way latency, and other metrics of network performance. Accordingly, timestamps inserted in transmitted data or packets should accurately reflect the time that the data or packets are transmitted from a transmitting device or at least have a consistent amount of delay from the time that the timestamps are inserted in the packets or data and the time that the packets or data leave the transmitting device.

One problem associated with inserting timestamps in transmitted data is the varying amounts of latency that can occur between the point where a timestamp is inserted into the transmit data stream and the point where the packet or other data leaves the transmitting device. For example, a timestamp may be inserted into a transmit data stream at a point in the transmit pipeline that is prior to physical component sublayer (PCS) and forward error correction (FEC) processing blocks. PCS and forward error correction processing blocks may introduce variable amounts of delay in successive packets and especially between successive startups of a card or device that is transmitting data. Such variable latency or delay can be caused by clock domain crossings within PCS and/or FEC processing blocks. Such clock domain crossings can occur when data is read into a register in one clock domain and transmitted out of the register on another clock domain.

The variable latency in successive packet transmissions from the point where packets are transmitted means that timestamps may not be consistent across packets. This lack of consistency is magnified in high-speed networks, such as 100 GB Ethernet networks, where clock periods can be as short as 6.7 nanoseconds. In such a system, a 10 nanosecond variance in transmit timestamp latency caused by cross domain crossings or other asynchronous effects results in excessive jitter in the time between timestamp insertion and packet transmission.

Accordingly, there exists a need for methods, systems, and computer readable media for transmit timestamp autocalibration.

SUMMARY

The subject matter described herein includes methods, systems, and computer readable media for transmit timestamp autocalibration. One method for transmit timestamp autocalibration includes generating a calibration pulse for calibrating a transmit timestamp in a transmitting device. The method further includes applying the calibration pulse to a transmit data pipeline in the transmitting device. The method further includes sampling a transmit timestamp when the calibration pulse reaches a timestamp sample triggering location in the transmit data pipeline upstream from an egress point of the transmitting device. The method further includes measuring a latency between a time that the calibration pulse reaches the timestamp sample triggering location and a time that the calibration pulse reaches a location downstream from the timestamp sample triggering location. The method further includes generating an adjusted timestamp based on the measured latency and inserting the adjusted timestamp into a data packet to be transmitted from the transmitting device.

A system for transmit timestamp autocalibration includes a calibration pulse generator for generating a calibration pulse for calibrating a transmit timestamp in a transmitting device and for applying the calibration pulse to a transmit data pipeline in the transmitting device. The system further includes a transmit timestamp sampler for sampling a transmit timestamp when the calibration pulse reaches a transmit timestamp sample triggering location upstream from an egress point of the transmitting device. The system further includes a timestamp adjuster for measuring a latency between a time that the calibration pulse reaches the timestamp sample triggering location and a time that the calibration pulse reaches a location downstream from the timestamp sample triggering location, generating an adjusted timestamp based on the measured latency, and inserting the adjusted timestamp into a data packet to be transmitted from the transmitting device.

The subject matter described herein reduces variability in transmit timestamp latency. Transmit timestamp latency, as used herein, refers to the delay between timestamp sampling in the transmit data pipeline and the exiting of a timestamped packet or frame from the transmitting device. By making transmit timestamp delay more uniform between successive packets and between successive startups of a transmitting device, the transmit timestamps, in a test environment, can be used to more accurately measure network timing related conditions, such as latency and jitter. In a non-test environment, reduced variability in transmit timestamp latency reduce variability in network protocol functions that rely on transmit timestamps.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
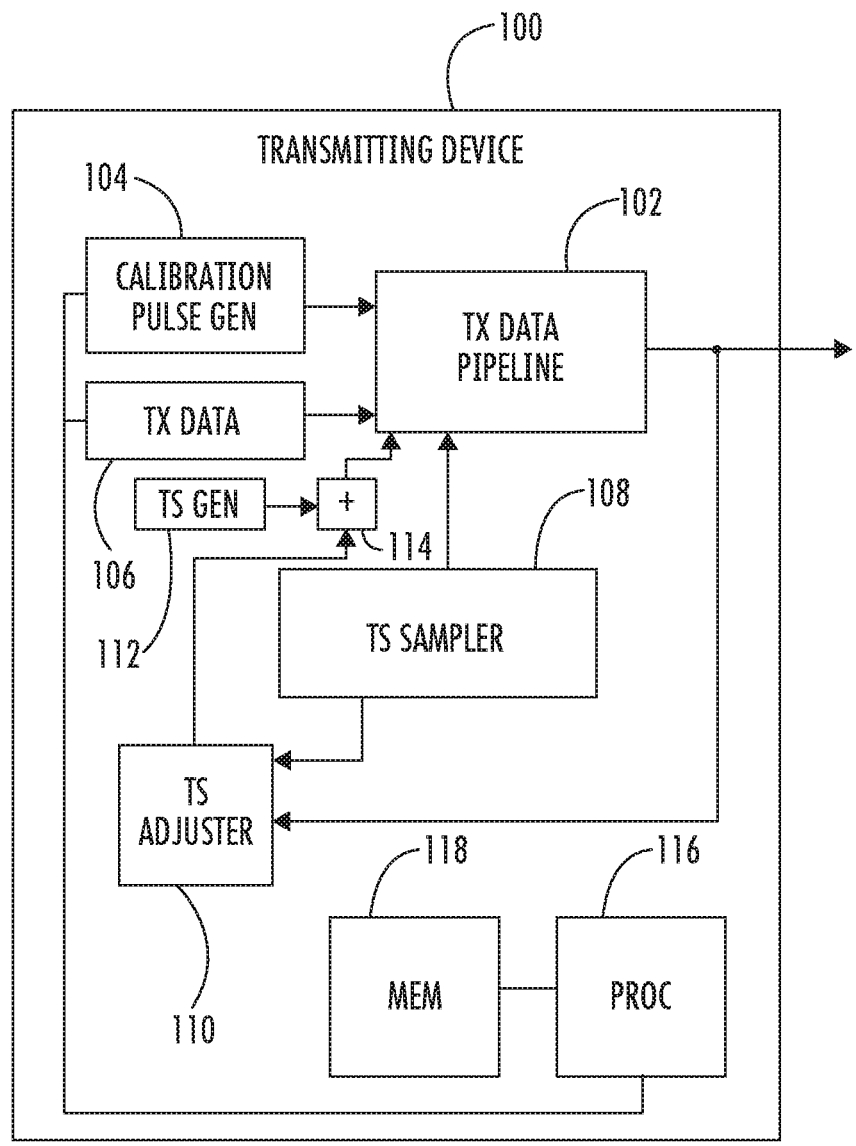
FIG. 1 is a block diagram illustrating an exemplary system for transmit timestamp autocalibration.

The subject matter described herein includes methods, systems, and computer readable media for transmit timestamp autocalibration. FIG. 1 is a block diagram illustrating an exemplary system for transmit timestamp autocalibration. Referring to FIG. 1, the system includes a transmitting device 100. Transmitting device 100 may be any device that transmits packets over a network. For example, transmitting device 100 may be a network equipment test device, a network device, such as a switch, a router, or a firewall, or a component of a network equipment test device or a network device. For example, in one implementation, transmitting device 100 may be a line card suitable for transmitting data over a physical medium. Such a line card may conform to Ethernet standards, such as 100 or 400 gigabit Ethernet standards.

In the illustrated example, transmitting device 100 includes a transmit data pipeline 102 that performs the various processing necessary to transmit data on to a physical medium. For example, if the physical medium is Ethernet, transmit data pipeline 102 may include various components for generating Ethernet frames. In the illustrated example, transmit data pipeline 102 receives a calibration pulse or calibration metadata from a calibration pulse generator 104. The calibration pulse is used to automatically calibrate timestamp generation of transmitting device 100. The calibration pulse or metadata may be any suitable signal for triggering timestamp autocalibration. In one example, the calibration pulse may be a virtual lane marker used in Ethernet data streams to identify data in different virtual lanes and remove skew between the virtual lanes.

In one implementation, the calibration pulse may be transmitted and the timestamp generation function may be automatically calibrated before transmitting device 100 transmits real data over a network. Transmitting device 100 also includes a transmit data generator 106 for generating data to be transmitted over a network.

A timestamp sampler 108 samples a transmit timestamp when the calibration pulse reaches a location before an egress point of transmitting device 100. A timestamp adjuster 110 monitors latency between the location where timestamp sampler 108 samples a transmit timestamp and a location where packets exit transmitting device 100. The monitored latency values are used by timestamp adjuster 110 which adjusts the transmit timestamps based on a delay. In one implementation, timestamp adjuster 110 may accumulate latency measurements for calibration pulses successively generated by calibration pulse generator 104. Timestamp adjuster 110 may calculate an average or other statistical measure of the accumulated latency and use the average or other statistical measure of accumulated latency to adjust timestamp values inserted into packets after the autocalibration process concludes.

Figure 2:
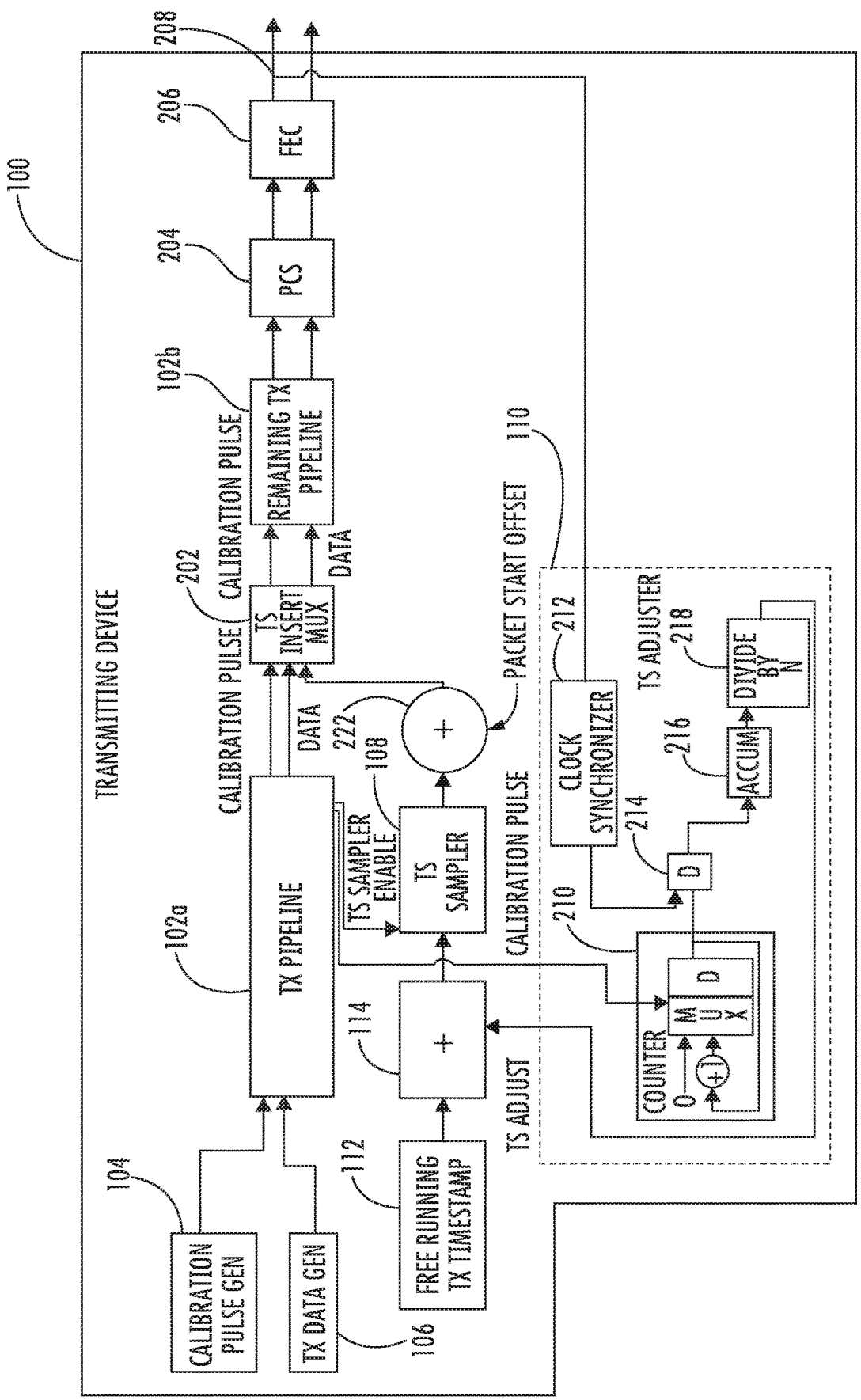
FIG. 2 is a block diagram illustrating an exemplary system for transmit timestamp autocalibration.

FIG. 2 is a more detailed block diagram illustrating a system for transmit timestamp autocalibration in more detail. In FIG. 2, the location of timestamp sampling by timestamp sampler 108, the locations in the transmit data pipeline that trigger delay measurement, and the components of timestamp adjuster that implement timestamp adjustment are shown in more detail than in FIG. 1. A free running timestamp generator 200 generates timestamps to be inserted in frames to be transmitted from transmitting device 100. The timestamps may be formatted according to the protocol of the frames in which the timestamps are inserted. In one example, a transmit timestamp may be a 32 or 64 bit value inserted into a frame header, a frame trailer, or a frame payload. The transmit timestamp may be in any suitable units. In one example, the transmit timestamp may be a 32 bit hexadecimal value that represents the current time in nanoseconds since a start time.

Free running timestamp generator 200 may operate based on a transmit clock. In one example, free running timestamp generator 200 may operate based on the clock having a frequency suitable for 10, 40, 50, 100, or 400 gigabit Ethernet transmission. Before any timestamp adjustments are made, the timestamp output from free running transmit timestamp generator 200 is inserted into the transmit data pipeline at a location prior to the egress point of the transmit data pipeline. In the Illustrated example, a timestamp insertion multiplexer 202 located between the ingress and egress points of the transmit data pipeline is used to insert the timestamp in the stream of transmitted data.

It should also be noted that the location of timestamp insertion is prior to PCS unit 204 and FEC unit 206. PCS unit 204 performs physical coding sublayer processing of data to be transmitted from transmitting device 100. FEC unit 206 applies forward error correction to data to be transmitted from transmitting device 100. The PCS processing performed by PCS unit 204 includes performing 64/66b encoding of data and adding virtual lane markers that allow receivers to deskew the lanes. FEC processing performed by FEC unit 206 involves applying error-correction coding to received data bits. Both PCS and FEC processing can result in clock domain crossings, i.e., data may be read into FEC unit 206 or PCS unit 204 on a different clock domain that data is read out of FEC unit 206 or PCS unit 204. As a result of these clock domain crossings, transmit timestamp latency can vary across successive startups of transmitting device 100 and across packets within the same operating period of transmitting device 100. By measuring this latency and adjusting timestamps based on the latency, variability in transmit timestamp latency can be reduced.

In one exemplary implementation, calibration pulse generator 104 generates a series of N calibration pulses, N being an integer, and the calibration pulses are used to measure latency values from the point where the calibration pulse triggers timestamp sampling to a location 208 outside of the transmit pipeline. Timestamp adjuster 110 measures a latency value for each calibration pulse. To measure the latency value, when a calibration pulse is generated, applied to transmit data pipeline 102a, and reaches a timestamp sample triggering location in transmitting device 100, a counter 210 is reset. The timestamp sample triggering location may be any location in transmitting device 100 upstream from an egress point 208 where data exits transmitting device 100.

When the calibration pulse reaches egress point 208, the value of counter 210 is read and stored as the latency value for the current calibration pulse. A clock synchronizer 212 synchronizes the signal that triggers reading of the value of timer 210 such that the read signal is in the same clock domain as the sampled transmit timestamp. Once synchronized, the signal output from clock synchronizer 212 is used to enable a D flip-flop 214 to output the current counter value, which is a measure of the transmit timestamp latency for the first calibration pulse.

A latency accumulator 216 stores the current latency value. A divide by N divider 218 divides the accumulated latency by the number of samples. For example, if it is determined that 16 calibration pulses will be used to calibrate the transmit timestamp, divide by N divider 218 will initially divide by 16. Thus, for the first 15 calibration pulses, the divide by N divider will output an incorrect timestamp adjustment value. However, on the 16$^{th}$ sample, the divide by number of sample divider 218 will output a timestamp adjustment value that represents the average latency over the 16 samples.

Timestamp adjuster 110 outputs the timestamp adjustment value to an adder 114 that adjusts the timestamp output from free running timestamp generator 200 based on the timestamp adjustment value. In the example described above, the timestamp value output from free running timestamp generator 200 is added to the timestamp adjustment value to produce the adjusted timestamp. The adjusted timestamp is provided to timestamp sampler 108 which provides the adjusted timestamp value to adder 222, which provides the adjusted timestamp to timestamp insertion multiplexer (MUX) 202 for insertion into the transmit data stream after a configurable packet start offset representing the location in the packet where the timestamp should be inserted. Timestamp insertion MUX 202 inserts the adjusted timestamp into the transmit data stream and the proper offset from the start of the packet.

Thus, using the system illustrated in FIG. 2, transmit timestamps can be automatically calibrated based on a sequence of calibration pulses that is transmitted through the transmit pipeline prior to real data transmission. The process described with respect to FIG. 2 may occur any time the card or transmitting device is restarted to ensure consistency between successive startups of transmitting device 100. Once the timestamp adjustment value is calculated, the value may be used for each timestamp inserted by transmitting device 100 until the next startup of transmitting device 100, when a new timestamp adjustment value may be calculated. In an alternate implementation, transmit timestamp adjustment calculation can be performed periodically while transmitting device 100 is transmitting data between startups of transmitting device 100.

Figure 3:
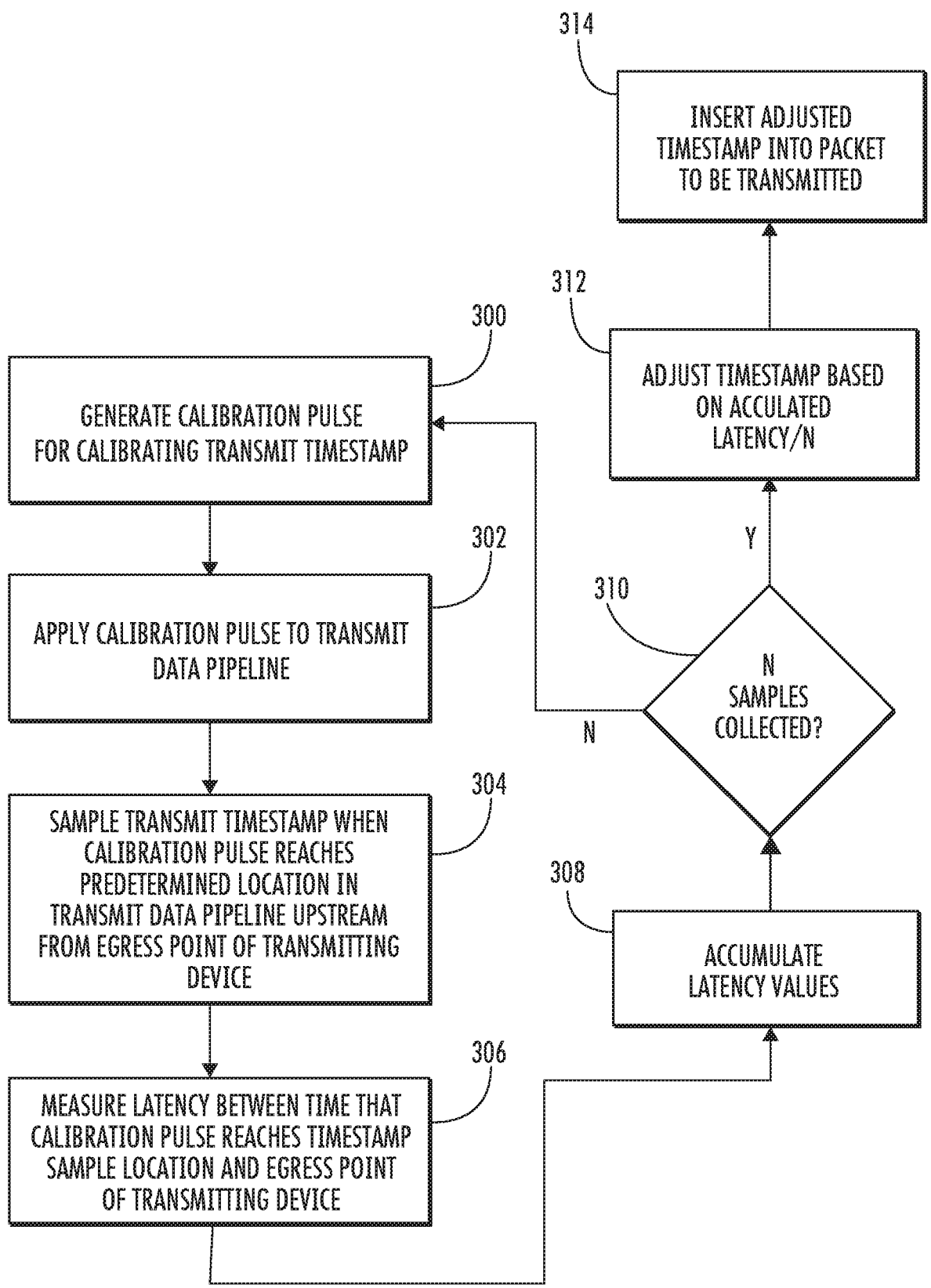
FIG. 3 is a flow chart illustrating an exemplary process for transmit timestamp autocalibration.

FIG. 3 is a flow chart illustrating an exemplary process for transmitting timestamp autocalibration. Referring to FIG. 3, in step 300, a calibration pulse for calibrating a transmit timestamp is generated. The calibration pulse may be a sequence of data of a length that is longer than the expected transmit timestamp latency being measured. For example, if the expected transmit timestamp latency is 10 ns, then the calibration pulse may be configured to be at least 10 ns in length at the clock frequency of transmitting device 100. The reason for making the calibration pulse at least as long as the expected timestamp latency measurement is to reduce the likelihood that counter 210 will be reset by another calibration pulse before the latency measurement for the first pulse is concluded.

In step 302, the calibration pulse is applied to the transmit data pipeline. For example, calibration pulse generator 104 may apply the calibration pulse to an ingress point of transmit pipeline 102A or at any point in transmit data pipeline 102A or 102B that is upstream from PCS unit 204 and FEC unit 206. As used herein, an upstream location in transmitting device 100 is a location that will be encountered by the calibration pulse prior to other locations in transmitting device 100. Applying the calibration pulse to the transmit pipeline upstream from the PCS and FEC units allows latency caused by the PCS and FEC units to be measured using the calibration pulse. Similarly, as used herein, a downstream location in transmitting device 100 refers to a location encountered by the calibration pulse after other locations.

In step 304, the transmit timestamp is sampled when the calibration pulse reaches a transmit timestamp sample triggering location that is upstream from an egress point of transmitting device 100. For example, timestamp sampler 108 may be enabled to sample a current timestamp from free running timestamp generator 200 or an adjusted timestamp output from adder 220 when the calibration pulse reaches a location in transmit pipeline 102a that is upstream from egress point 208 where data will exit transmitting device 100.

In step 306, latency is measured between the time that the calibration pulse reaches the timestamp sample triggering location and a location in the transmitting device that is downstream from the timestamp sample triggering location. For example, when the calibration pulse reaches the location that triggers timestamp sampler 108 to sample the current timestamp value, counter 210 may be started or reset. When the calibration pulse reaches location 208, the value of counter 210 is output from D flip-flop 214 as a latency sample.

In step 308, latency values are accumulated. For example, latency accumulator 216 may accumulate successive latency values by storing the values in memory and/or keeping a running sum of the latency values. For example, each time the calibration pulse travels from the location that triggered the sampling of the transmit timestamp to egress point 208, a latency value may be measured an accumulated. If the first 5 latency measurements are 50 ns, 70 ns, 90 ns, 30 ns, and 20 ns, the accumulated latency values may be (50, 70, 90, 30, 20). Alternatively, the accumulated latency may be the sum of the latency values since the last timestamp adjustment. Continuing with the present example, the accumulated latency value may be (260).

In step 310, it is determined whether N latency samples have been collected. N may be a fixed number or a number that is configurable by the user. If N samples have not been collected, control proceeds to step 300 where the next calibration pulse is generated. Steps 302, 304, 306, 308, and 310 are repeated for the next calibration pulse to accumulate a latency sample for the next calibration pulse. The process of retransmitting the calibration pulse, measuring the latency between the timestamp sample triggering location and the egress point, and accumulating the latency value may be repeated until N latency samples have been collected or accumulated.

If N samples have been collected, control proceeds to step 312 where the timestamp adjustment value is set to the accumulated latency divided by N, and the transmit timestamp is adjusted based on the timestamp adjustment value. For example, once N samples are accumulated an average latency may be calculated. Continuing with the example above, if the accumulated latency values are (50, 70, 90, 30, 20), the sum is 240, and the average is 48. Accordingly, the current value of the transmit timestamp may be set using the following equation:

$$\text{Adjusted timestamp value} = \text{current timestamp value} + \text{average latency} \quad (1)$$

Using Equation 1, if the unadjusted timestamp value output from timestamp sampler 108 is a 32 bit value in units of nanoseconds and the average latency is in nanoseconds, then the average latency or other indication of the measured latency may be added to the current sampled timestamp value to obtain the adjusted timestamp value. For example, if the sampled timestamp value is 0x0000 0005 and the measured latency is 48 in decimal or 0x30, the, using Equation 1, the adjusted timestamp would be:

$$0\text{x}0000\ 0005 + 0\text{x}30 = 0\text{x}0000\ 0035$$

or 53 ns in decimal. Because the latency accounts for variability in time stamp latency caused by clock domain crossings in the PCS or FEC units, there should be less variability in timestamp latency between successive startups of transmitting device 100. As a result, transmit timestamps inserted in successive packets output from transmitting device 100 will have less variability induced by internal delays within transmitting device 100 and can be used to more accurately measure latency and jitter caused by the network. In one exemplary implementation, transmitting device 100 may be a network equipment test device that generates test packets, timestamps the test packets, and transmits the timestamped packets to a device under a test over a network. The device under test may process the test packets and return the test packets to device 100. Transmitting device 100 may record a time of receipt of each test packet and measure roundtrip network delay of each packet as the difference between the transmit timestamp inserted in the test packet by device 100 and the time of receipt of each test packet. Because the variability in transmit timestamps is smoothed by the transmit timestamp autocalibration procedures described above, the roundtrip delay calculations can be accurately compared with each other.

In step 314, the adjusted timestamp is inserted into a packet to be transmitted from the transmitting device. For example, the adjusted timestamp value may be inserted in the timestamp field of a packet header, a packet trailer, or a packet payload. The location at which the timestamp is inserted depends on the protocol being implemented by transmitting device 100.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for transmit timestamp autocalibration for a transmit device in a data network, the method comprising:
    generating a calibration pulse for calibrating a transmit timestamp in a transmitting device;
    applying the calibration pulse to a transmit data pipeline in the transmitting device, wherein the calibration pulse comprises a signal that travels through the transmitting device and whose latency in reaching different points in the transmitting device is used to determine latency in the transmitting device;
    sampling the transmit timestamp when the calibration pulse reaches a timestamp sample triggering location in the transmit data pipeline upstream from an egress point of the transmitting device;
    measuring a latency between a time that the calibration pulse reaches the timestamp sample triggering location and a time that the calibration pulse reaches a location downstream from the timestamp sample triggering location; and
    generating an adjusted timestamp based on the measured latency and inserting the adjusted timestamp into a data packet to be transmitted from the transmitting device, wherein the transmitting device comprises a physical component sublayer (PCS) unit and a forward error correction (FEC) unit coupled to an output of the PCS unit, wherein the timestamp triggering location is upstream from the PCS unit and the FEC unit and the location downstream from the timestamp triggering location comprises an output of the FEC unit and the timestamp adjuster further comprises a counter that is reset with the calibration pulse reaches the timestamp sample triggering location and a clock synchronizer coupled to the output of the FEC that generates a read signal that triggers reading of a value of the counter when the calibration pulse reaches the output of the FEC and that is in the same clock domain as the sampled transmit timestamp.

2. The method of claim 1 wherein applying the calibration pulse to the transmit data pipeline includes applying the calibration pulse to an ingress point of the transmit data pipeline.

3. The method of claim 1 wherein the calibration pulse comprises a virtual lane marker.

4. The method of claim 1 wherein the adjusted timestamp corrects for latency caused by clock domain crossing in the PCS unit or the FEC unit.

5. The method of claim 1 wherein measuring the latency includes
    setting the latency to the value of the counter when the calibration pulse reaches the output of the FEC unit.

6. The method of claim 1 wherein generating the adjusted timestamp includes adding an indication of the measured latency to a current timestamp value.

7. The method of claim 1 comprising generating the calibration pulse a predetermined number of times, measuring a latency value associated with each calibration pulse; accumulating the latency values, and wherein adjusting the timestamp includes adjusting the timestamp based on the accumulated latency values.

8. The method of claim 7 wherein adjusting the latency based on the accumulated latency values includes computing an average latency value and adjusting the latency based on the average latency value.

9. The method of claim 1 wherein the adjusted timestamp reduces variability in timestamp latency between startups of the transmitting device.

10. A system for transmit timestamp autocalibration for a transmit device in a data network, the system comprising:
    a calibration pulse generator for generating a calibration pulse for calibrating a transmit timestamp in a transmitting device and for applying the calibration pulse to a transmit data pipeline in the transmitting device, wherein the calibration pulse comprises a signal that travels through the transmitting device and whose latency in reaching different points in the transmitting device is used to determine latency in the transmitting device;
    a transmit timestamp sampler for sampling a transmit timestamp when the calibration pulse reaches a transmit timestamp sample triggering location upstream from an egress point of the transmitting device;
    a timestamp adjuster for measuring a latency between a time that the calibration pulse reaches the timestamp sample triggering location and a time that the calibration pulse reaches a location downstream from the timestamp sample triggering location, generating an adjusted timestamp based on the measured latency, and inserting the adjusted timestamp into a data packet to be transmitted from the transmitting device;
    a physical component sublayer (PCS) unit; and
    a forward error correction (FEC) unit coupled to an output of the PCS unit, wherein the timestamp triggering location is upstream from the PCS unit and the FEC unit and the location downstream from the timestamp triggering location comprises an output of the FEC unit and the timestamp adjuster further comprises:
a counter that is reset with the calibration pulse reaches the timestamp sample triggering location; and
a clock synchronizer coupled to the output of the FEC that generates a read signal that triggers reading of a value of the counter when the calibration pulse reaches the output of the FEC and that is in the same clock domain as the sampled transmit timestamp.

11. The system of claim 10 wherein applying the calibration pulse to the transmit data pipeline includes applying the calibration pulse to an ingress point of the transmit data pipeline.

12. The system of claim 10 wherein the calibration pulse comprises a virtual lane marker.

13. The system of claim 10 wherein the adjusted timestamp corrects for latency caused by clock domain crossing in the PCS unit or the FEC unit.

14. The system of claim 10 wherein
the timestamp adjustment adjuster is configured to set the latency to the value of the counter when the calibration pulse reaches the output of the FEC.

15. The system of claim 10 wherein generating the adjusted timestamp includes adding an indication of the measured latency to a current timestamp value.

16. The system of claim 10 comprising generating the calibration pulse a predetermined number of times, measuring a latency value associated with each calibration pulse; accumulating the latency values, and wherein adjusting the timestamp includes adjusting the timestamp based on the accumulated latency values.

17. The system of claim 16 wherein adjusting the latency based on the accumulated latency values includes computing an average latency value and adjusting the latency based on the average latency value.

18. A non-transitory computer readable medium having stored thereon executable instructions that when executed by a processor of a computer control the computer to perform steps comprising:

generating a calibration pulse for calibrating a transmit timestamp in a transmitting device for a transmit device in a data network;

applying the calibration pulse to a transmit data pipeline in the transmitting device, wherein the calibration pulse comprises a signal that travels through the transmitting device and whose latency in reaching different points in the transmitting device is used to determine latency in the transmitting device;

sampling the transmit timestamp when the calibration pulse reaches a timestamp sample triggering location in the transmit data pipeline upstream from an egress point of the transmitting device;

measuring a latency between a time that the calibration pulse reaches the timestamp sample triggering location and a time that the calibration pulse reaches a location downstream from the timestamp sample triggering location; and generating an adjusted timestamp based on the measured latency and inserting the adjusted timestamp into a data packet to be transmitted from the transmitting device, wherein the transmitting device comprises a physical component sublayer (PCS) unit and a forward error correction (FEC) unit coupled to an output of the PCS unit, wherein the timestamp triggering location is upstream from the PCS unit and the FEC unit and the location downstream from the timestamp triggering location comprises an output of the FEC unit and the timestamp adjuster further comprises a counter that is reset with the calibration pulse reaches the timestamp sample triggering location and a clock synchronizer coupled to the output of the FEC that generates a read signal that triggers reading of a value of the counter when the calibration pulse reaches the output of the FEC and that is in the same clock domain as the sampled transmit timestamp.

* * * * *